(12) United States Patent
Sakurai

(10) Patent No.: US 12,428,017 B2
(45) Date of Patent: Sep. 30, 2025

(54) VEHICLE CONTROL DEVICE

(71) Applicant: TOYOTA JIDOSHA KABUSHIKI KAISHA, Toyota (JP)

(72) Inventor: Keiko Sakurai, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 36 days.

(21) Appl. No.: 18/637,699

(22) Filed: Apr. 17, 2024

(65) Prior Publication Data

US 2025/0074446 A1    Mar. 6, 2025

(30) Foreign Application Priority Data

Aug. 29, 2023   (JP) ................................. 2023-139110

(51) Int. Cl.
  *B60W 50/14*  (2020.01)
  *G06V 20/58*  (2022.01)

(52) U.S. Cl.
  CPC ............. *B60W 50/14* (2013.01); *G06V 20/58* (2022.01); *B60W 2050/143* (2013.01); *B60W 2050/146* (2013.01); *B60W 2420/403* (2013.01); *B60W 2554/802* (2020.02)

(58) Field of Classification Search
  CPC ........... B60W 50/14; B60W 2050/143; B60W 2050/146; B60W 2420/403; B60W 2554/802; G06V 20/58
  See application file for complete search history.

(56) References Cited

U.S. PATENT DOCUMENTS

| | | |
|---|---|---|
| 7,692,534 B2 | 4/2010 | Kataoka et al. |
| 8,352,124 B2 | 1/2013 | Taguchi |
| 8,682,500 B2 | 3/2014 | Sakugawa |
| 8,818,634 B2 | 8/2014 | Fujita et al. |
| 9,168,953 B2 | 10/2015 | Mitsumoto et al. |
| 9,714,034 B2 | 7/2017 | Otake et al. |
| 9,880,558 B2 | 1/2018 | Nakamura |
| 9,902,399 B2 | 2/2018 | Torii et al. |
| 10,345,443 B2 | 7/2019 | Masui et al. |
| 10,611,240 B2 | 4/2020 | Masui et al. |

(Continued)

FOREIGN PATENT DOCUMENTS

| | | |
|---|---|---|
| JP | 2010-030398 A | 2/2010 |
| JP | 2015-209129 A | 11/2015 |

(Continued)

*Primary Examiner* — Mohamed Barakat
(74) *Attorney, Agent, or Firm* — SoraIP, Inc.

(57) ABSTRACT

When a preceding vehicle condition is satisfied, a vehicle control device reduces either or both of deviation warning and deviation control compared to when the preceding vehicle condition is not satisfied. The preceding vehicle condition is satisfied when the condition that the other vehicle is detected in front of the host vehicle, and the left lateral distance or the right lateral distance is equal to or greater than the first threshold distance, the condition that the vehicle speed of the other vehicle is equal to or lower than the threshold vehicle speed, and the condition that both the right and left turn signals of the other vehicle are activated, only the right turn signal of the other vehicle located on the right side of the travel area is activated, or only the left turn signal of the other vehicle located on the left side of the travel area is activated.

5 Claims, 5 Drawing Sheets

(56) References Cited

U.S. PATENT DOCUMENTS

| | | | |
|---|---|---|---|
| 10,814,873 B2 * | 10/2020 | Dakemoto | B60S 1/486 |
| 12,344,270 B2 * | 7/2025 | Oh | G06F 9/5072 |
| 2018/0061240 A1 * | 3/2018 | Lee | B60W 30/09 |
| 2018/0229770 A1 * | 8/2018 | Kataoka | B62D 1/286 |
| 2018/0357904 A1 * | 12/2018 | Miyata | G08G 1/166 |
| 2019/0367023 A1 * | 12/2019 | Kobayashi | B60W 30/12 |
| 2020/0094825 A1 * | 3/2020 | Kato | G06V 20/588 |
| 2023/0013737 A1 * | 1/2023 | Kim | B60W 30/12 |
| 2023/0055183 A1 | 2/2023 | Itazuri | |
| 2023/0125119 A1 | 4/2023 | Ogawa | |
| 2023/0406316 A1 * | 12/2023 | Kume | B60K 35/28 |

FOREIGN PATENT DOCUMENTS

| | | |
|---|---|---|
| JP | 2023-027676 A | 3/2023 |
| JP | 2023-064937 A | 5/2023 |

\* cited by examiner

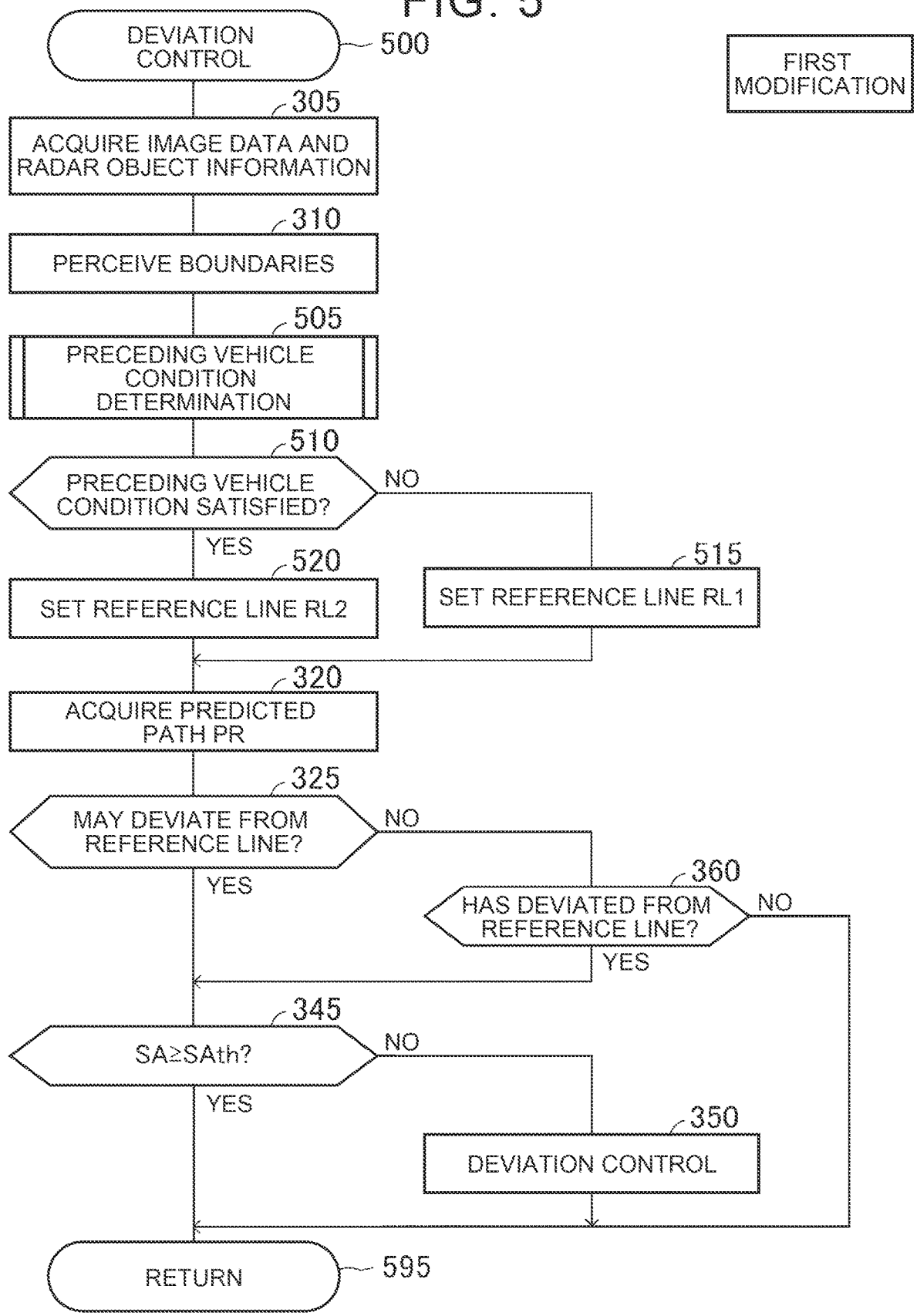

VEHICLE CONTROL DEVICE

CROSS-REFERENCE TO RELATED APPLICATION

This application claims priority to Japanese Patent Application No. 2023-139110 filed on Aug. 29, 2023, incorporated herein by reference in its entirety.

BACKGROUND

1. Technical Field

The present disclosure relates to vehicle control devices that execute either or both of deviation warning related to deviation of a host vehicle from its travel area and deviation control for reducing deviation of the host vehicle from its travel area.

2. Description of Related Art

There is conventionally known a vehicle control device that executes either or both of deviation warning and deviation control when an execution condition is satisfied. This execution condition is satisfied when a host vehicle is predicted to deviate from its travel area or when the host vehicle has deviated from its travel area. For example, a vehicle control device described in Japanese Unexamined Patent Application Publication No. 2010-30398 (JP 2010-30398 A) (hereinafter referred to as "conventional device") starts the deviation control when the execution condition is satisfied. When the amount of driver's steering intervention in a deviation direction in which a host vehicle deviates or has deviated from its travel area becomes equal to or larger than a predetermined value, the conventional device stops the deviation control in order to reduce the possibility that the driver may find the deviation control annoying.

For example, if the deviation control is stopped when the driver notices a vehicle traveling next to the host vehicle in an adjacent lane and stops changing lanes, the driver may feel uncomfortable. Therefore, when an obstacle (e.g., a vehicle traveling next to the host vehicle in an adjacent lane) is detected on either side of the host vehicle, the conventional device sets the predetermined value to a value larger than normal so that the deviation control is less likely to be stopped.

SUMMARY

There are a case where there is another vehicle (right-turn vehicle) stopped (or traveling slowly) ahead on the right side of the "travel area where a host vehicle is traveling" in order to turn right, and a case where there is another vehicle (left-turn vehicle) stopped (or traveling slowly) ahead on the left side of the travel area in order to turn left. There is also a case where there is another vehicle (vehicle with hazards on) stopped (or traveling slowly) ahead on the right side or left side of the travel area with its hazard lights on. When there is such a vehicle, the driver may perform an intentional steering maneuver in order to pass this vehicle. When the deviation control is executed while the driver is performing such an intentional steering maneuver, the driver may find this deviation control annoying.

The present disclosure was made to address the above-mentioned issue. In other words, it is one object of the present disclosure to provide a vehicle control device that reduces the possibility that a driver may find deviation control annoying when the driver is performing an intentional steering maneuver in order to pass a right-turn vehicle, a left-turn vehicle, or a vehicle with hazards on.

A vehicle control device of the present disclosure (hereinafter simply referred to as "device of the present disclosure") includes:
- a camera configured to capture an image of surroundings in front of a host vehicle and acquire image data; and
- a control unit configured to execute, when an execution condition is satisfied, either or both of deviation warning related to deviation of the host vehicle from a travel area of the host vehicle and deviation control for reducing deviation of the host vehicle from the travel area, the travel area being an area identified based on the image data, and the execution condition being a condition that is satisfied when the host vehicle is predicted to deviate from the travel area or when the host vehicle has deviated from the travel area.

The control unit is configured to
when all of the following three conditions are satisfied, reduce either or both of the deviation warning and the deviation control compared to when at least one of the three conditions is not satisfied: a first condition that another vehicle is detected in front of the host vehicle and a left lateral distance from a left boundary of the travel area to the another vehicle or a right lateral distance from a right boundary of the travel area to the another vehicle is equal to or greater than a first threshold distance, a second condition that a vehicle speed of the another vehicle is equal to or less than a threshold vehicle speed, and a third condition that both right and left turn signals of the another vehicle are activated, only the right turn signal of the another vehicle is activated when the left lateral distance is equal to or greater than the first threshold distance, or only the left turn signal of the another vehicle is activated when the right lateral distance is equal to or greater than the first threshold distance.

When there is a right-turn vehicle, a left-turn vehicle, or a vehicle with hazards on in front of the vehicle, it is highly likely that all of the first to third conditions are satisfied (preceding vehicle condition described later is satisfied). According to the device of the present disclosure, when all of the first to third conditions are satisfied, the deviation warning and the deviation control are reduced compared to when at least one of the first to third conditions is not satisfied. As a result, it is possible to reduce the possibility that a driver may find the deviation control annoying when the driver is performing an intentional steering maneuver in order to pass a right-turn vehicle, a left-turn vehicle, or a vehicle with hazards on.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 5 is a flow chart of a deviation control routine executed by CPU of ECU of the vehicle control device according to a first modification of the embodiment of the present disclosure.

DETAILED DESCRIPTION OF EMBODIMENTS

Figure 1:
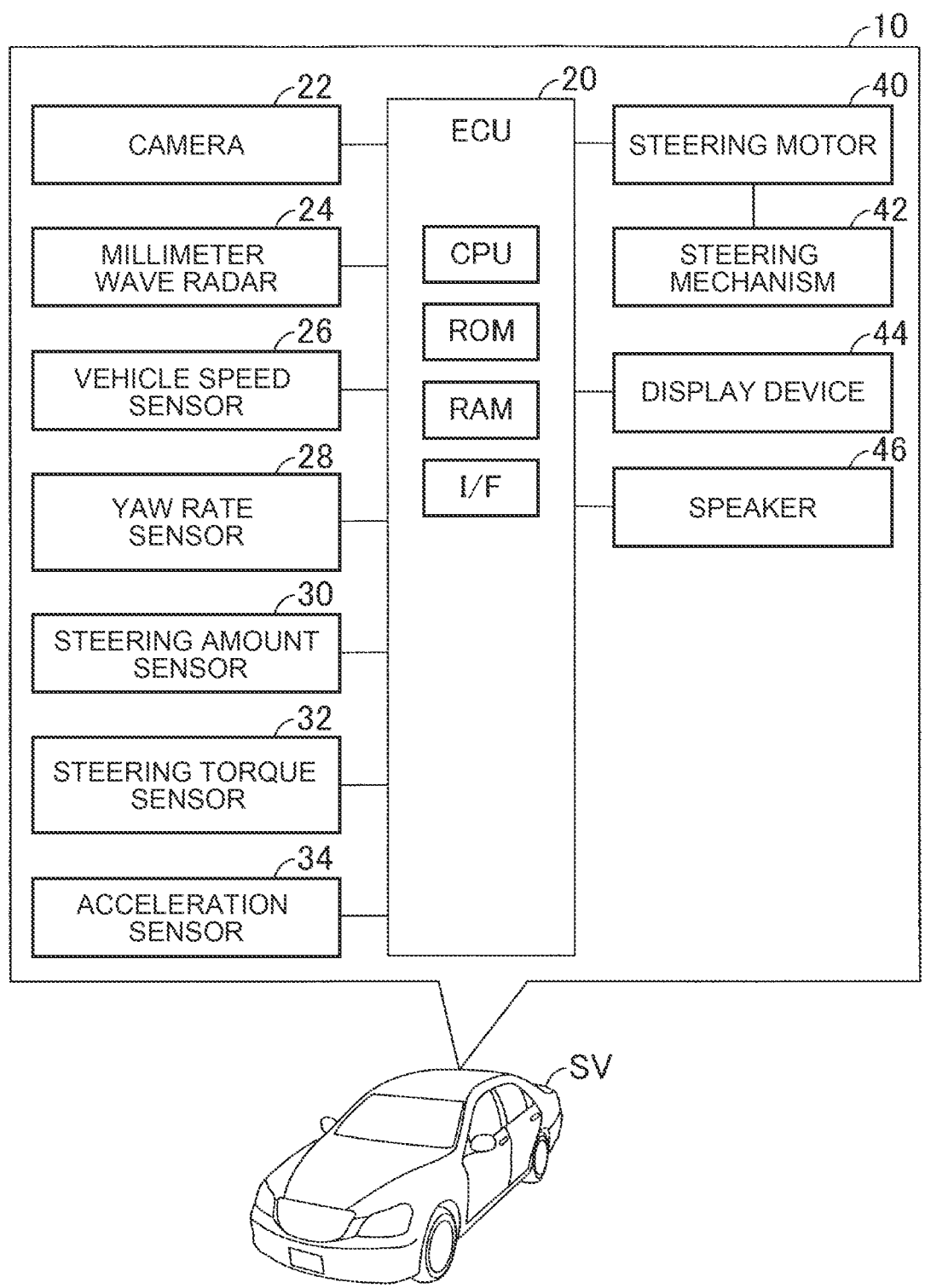
FIG. 1 is a schematic system configuration diagram of a vehicle control device according to an embodiment of the present disclosure.

As shown in FIG. 1, the vehicle control device 10 (hereinafter, referred to as "the device 10") according to the present embodiment is applied to the host vehicle SV and includes components shown in FIG. 1.

ECU 20 executes deviation control which is a kind of automated driving. The deviation control is control for reducing deviation of the host vehicle SV from the travel area TA (see FIG. 2).

In the present specification, "ECU 20" is an electronic control device including a microcomputer as a main part. The ECU 20 are also referred to as control units, controllers, and computers. The microcomputer includes a CPU (processor), a ROM, RAM, interfaces, and the like. The function implemented by the ECU 20 may be implemented by a plurality of ECU.

The camera 22 acquires image data by capturing an image of the surroundings in front of the host vehicle SV. The ECU 20 acquires the image data from the cameras 22.

The millimeter wave radar 24 transmits millimeter waves forward of the host vehicle SV. The millimeter wave radar 24 identifies the "position of the object with respect to the host vehicle SV" and the "relative speed Vr of the target with respect to the host vehicle SV" by receiving the reflected wave reflected by the object by the transmitted millimeter wave. ECU 20 obtains, from the millimeter wave radar 24, radar object information including the position and the relative speed Vr of the object with respect to the host vehicle SV.

The vehicle speed sensor 26 detects a host vehicle speed Vs representing the speed of the host vehicle SV. The yaw rate sensor 28 detects a yaw rate Yr of the host vehicle SV. The steering quantity sensor 30 detects the steering amount SA of the steering wheel SW (see FIG. 2). The steering torque sensor 32 detects a steering torque Tr of the steering wheel SW. The acceleration sensor 34 detects an acceleration Gx of the host vehicle SV in the front-rear axial direction and an acceleration Gy of the host vehicle SV in the vehicle widthwise direction. ECU 20 obtains the detections of these sensors.

The steering motor 40 is incorporated in the steering mechanism 42. The steering mechanism 42 is a mechanism for turning the steered wheels in response to manipulation of the steering wheel SW. In response to an instruction from ECU 20, the steering motor 40 causes the steering mechanism 42 to generate an assist torque for assisting the steering wheel to operate, and causes the steering mechanism 42 to generate an automatic steering torque for changing the steering angle of the steered wheels.

The display device 44 displays a deviation warning screen to be described later. The speaker 46 generates a deviation warning sound, which will be described later.

Deviation Control

Hereinafter, the deviation control will be described with reference to FIG. 2.

The ECU 20 perceives the boundary BL (right boundary RBL and left boundary LBL) of the travel area TA in which the host vehicle SV is traveling based on the image data. Examples of the boundary BL include white lines on the road, guardrails, curbs, and walls. ECU 20 sets the reference line RL (the right reference line RRL and the left reference line LRL) at a position separated from the boundary BL by a predetermined reference distance Dref in a direction perpendicular to the boundary BL.

When either the following condition E1 or E2 is satisfied, the ECU 20 determines that the execution condition is satisfied, and executes either or both of deviation warning and deviation control.

Condition E1: The predicted path PR intersects the reference line RL when the path distance Dpr along the predicted path PR of the host vehicle SV is equal to or less than the predetermined threshold distance Dth (when the condition E1 is satisfied, ECU 20 predicts that the host vehicle SV deviates from the travel area TA).

Condition E2: the host vehicle SV has deviated from the reference line RL.

As an example, ECU 20 obtains the predicted path PR based on the vehicle speed Vs and the yaw rate Yr in the predicted path PR.

ECU 20 obtains a target steering angle $\theta tgt$ for reducing deviation of the host vehicle SV from the reference line RL from which the host vehicle SV is likely to deviate (or has deviated) (that is, for returning the host vehicle SV to the inside of the reference line RL). When the target steering angle $\theta tgt$ is larger than the predetermined upper limit steering angle $\theta lmt$, ECU 20 sets the target steering angle $\theta tgt$ to the upper limit steering angle $\theta lmt$. ECU 20 controls the steering motor 40 so that the steering angle $\theta$ coincides with the target steering angle $\theta tgt$.

Intentional Steering Condition

Even when the above execution condition is satisfied, the ECU 20 does not execute the deviation control when the predetermined intentional steering condition is satisfied.

ECU 20 determines that the intentional steering condition is satisfied when at least one of the following conditions S1 to S3 is satisfied.

Condition S1: The steering amount SA in the deviation direction is equal to or greater than the threshold steering amount SAth.

Condition S2: The deviation lateral speed Vyd representing the lateral speed toward the deviation of the host vehicle SV is equal to or greater than the threshold lateral speed Vydth.

Condition S3: The deviation lateral acceleration Gyd representing the lateral acceleration toward the deviation of the host vehicle SV is equal to or greater than the threshold lateral acceleration Gydth.

The deviation lateral acceleration Gyd is acquired based on the acceleration Gy detected by the acceleration sensor 34. The deviation lateral speed Vyd is obtained based on the integrated value obtained by integrating the acceleration Gy with respect to time. In the following embodiments, ECU 20 will be described as determining that the intentional steering condition is satisfied when the condition S1 is satisfied.

Overview of Operation

When the preceding vehicle located in front of the host vehicle SV satisfies the preceding vehicle condition, the ECU 20 reduces the deviation control by making the intentional steering condition more easily satisfied than when the preceding vehicle does not satisfy the preceding vehicle condition.

ECU 20 determines that the preceding vehicle condition is satisfied when all of the following conditions P1 to P3 are satisfied.

Condition P1: A PV of another vehicle (hereinafter referred to as "preceding vehicle") is detected in front of the host vehicle SV, and the left lateral distance DL (see FIG. 2) or the right lateral distance DR (see FIG. 2) is equal to or greater than the first threshold distance D1*th* and equal to or less than the second threshold distance D2*th*.

The left lateral distance DL represents a distance from the left boundary LBL to the preceding vehicle PV. The right lateral distance DR represents a distance from the right boundary RBL to the preceding vehicle PV. The second threshold distance D2*th* is set to a value larger than the first threshold distance D1*th*. For example, it is preferable that the first threshold distance D1*th* is set to a value that is half of the width of a common road, and the second threshold distance D2*th* is set to a value obtained by adding a predetermined margin distance to a vehicle width of the host vehicle SV. When the left lateral distance DL or the right lateral distance DR is longer than the second threshold distance D2*th*, the host vehicle SV can overtake the preceding vehicle PV without deviating from the traveling lane TL. Therefore, when the left lateral distance DL or the right lateral distance DR is longer than the second threshold distance D2*th*, the deviation control is not reduced by preventing the preceding vehicle from being satisfied.

Condition P2: The preceding vehicle speed Vspv representing the speed of the preceding vehicle PV is equal to or less than the threshold vehicle speed Vsth.
The preceding vehicle speed Vspv is acquired based on the relative speed Vr of the preceding vehicle PV and the host vehicle speed Vs.

Condition P3: the right and left turn signals of the preceding vehicle PV are activated, the right turn signal of the preceding vehicle PV is activated when the left lateral distance DL is equal to or greater than the first threshold distance D1*th* and equal to or smaller than the second threshold distance D2*th*, or the left turn signal of the preceding vehicle PV is activated when the right lateral distance DR is equal to or greater than the first threshold distance D1*th* and equal to or smaller than the second threshold distance D2*th*.

When all of the above conditions P1 to P3 are satisfied (that is, when the preceding vehicle condition is satisfied), the preceding vehicle PV is a right-turn vehicle stopped or traveling slowly on the right side of the travel area TA, a left-turn vehicle stopped or traveling slowly on the left side of the travel area TA, or a vehicle with hazards on stopped or traveling slowly on the right or left side of the travel area TA. When such a preceding vehicle PV is present, the driver is highly likely to intentionally steer the host vehicle SV so as to deviate from the travel area TA in order to overtake such a preceding vehicle PV. When the deviation control is executed while the driver performs such steering, the driver is likely to feel the deviation control troublesome.

Therefore, in the present embodiment, when the preceding vehicle condition is satisfied, the deviation control is reduced by making the intentional steering condition more easily satisfied than when the preceding vehicle condition is not satisfied. Accordingly, the deviation control is less likely to be executed while the driver is performing the above steering. It is therefore possible to reduce the possibility that the driver may find the deviation control annoying.

Operation Example

Figure 2:
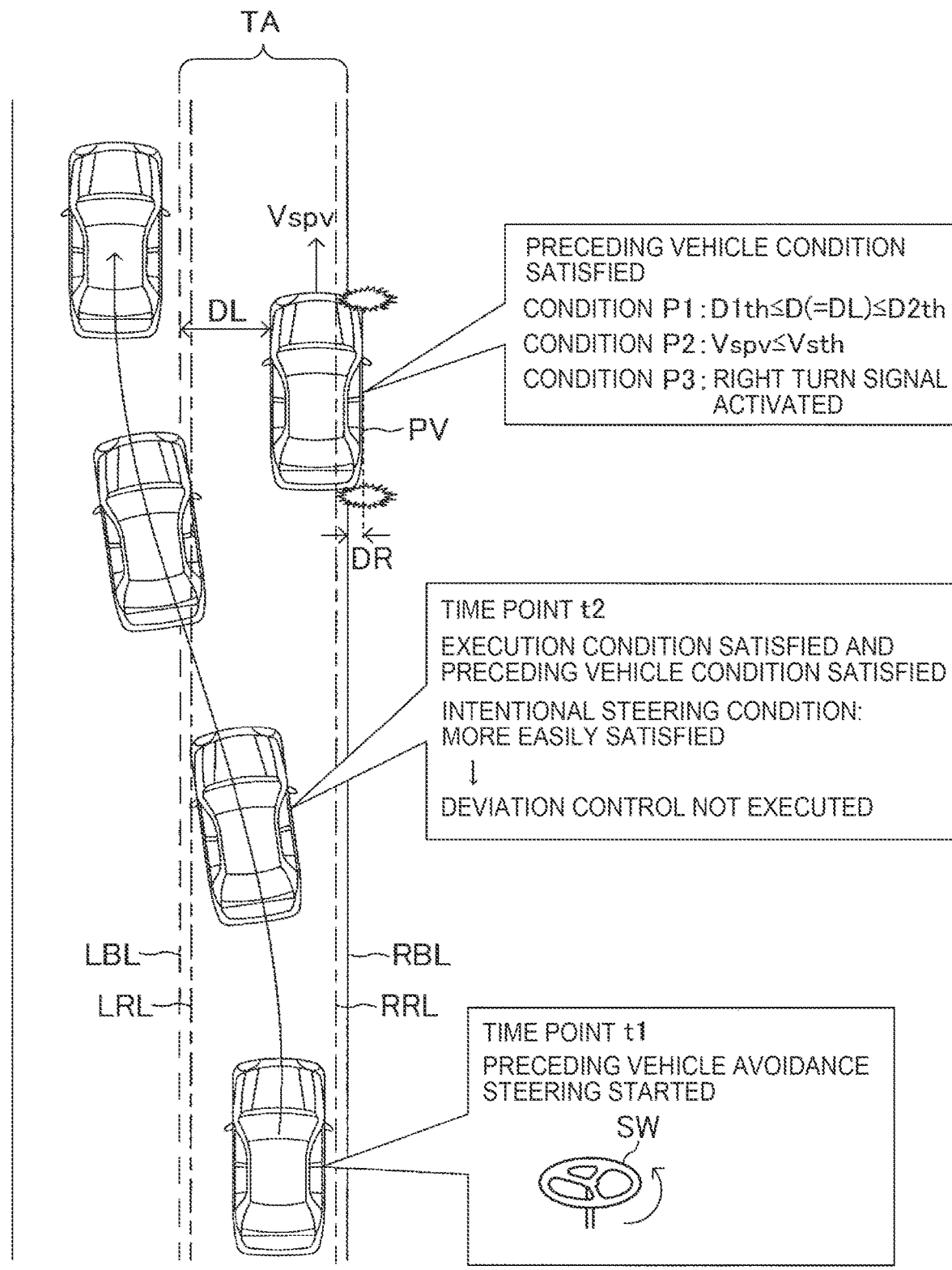
FIG. 2 is an illustration an operation example of the vehicle control device according to the embodiment of the present disclosure.

At time t1 shown in FIG. 2, the driver begins to cut the steering wheel SW to the left to overtake the preceding vehicle PV. At time t1, the execution condition has not yet been met.

At time t2, since the predicted path PR intersects the left reference line LRL with the path distance Dpr being equal to or smaller than the threshold distance Dth, the condition E1 is satisfied. Therefore, ECU 20 determines that the execution condition is satisfied.
At time t2, since the left lateral distance DL of the preceding vehicle PV is equal to or greater than the first threshold distance D1*th* and equal to or less than the second threshold distance D2*th*, the condition P1 is satisfied. Further, since the preceding vehicle speed Vspv is equal to or lower than the threshold vehicle speed Vsth, the condition P2 is satisfied. Further, since the right turn signal of the preceding vehicle PV is activated, the condition P3 is satisfied. Therefore, ECU 20 determines that the preceding vehicle condition is satisfied.

When the preceding vehicle condition is satisfied, the ECU 20 makes the intentional steering condition more easily satisfied, as described above. As an example, when the preceding vehicle condition is satisfied, the ECU 20 sets the threshold steering amount SAth to a second steering amount SA2*th* smaller than the first steering amount SA1*th* used when the preceding vehicle condition is satisfied.

In the present embodiment, even at and after time t2, the intentional steering condition is satisfied and the intentional steering condition is made more easily satisfied. Therefore, even when the execution condition is satisfied, the intentional steering condition is satisfied, so that the deviation control is not executed.

Specific Operation
Deviation Control

Figure 3:
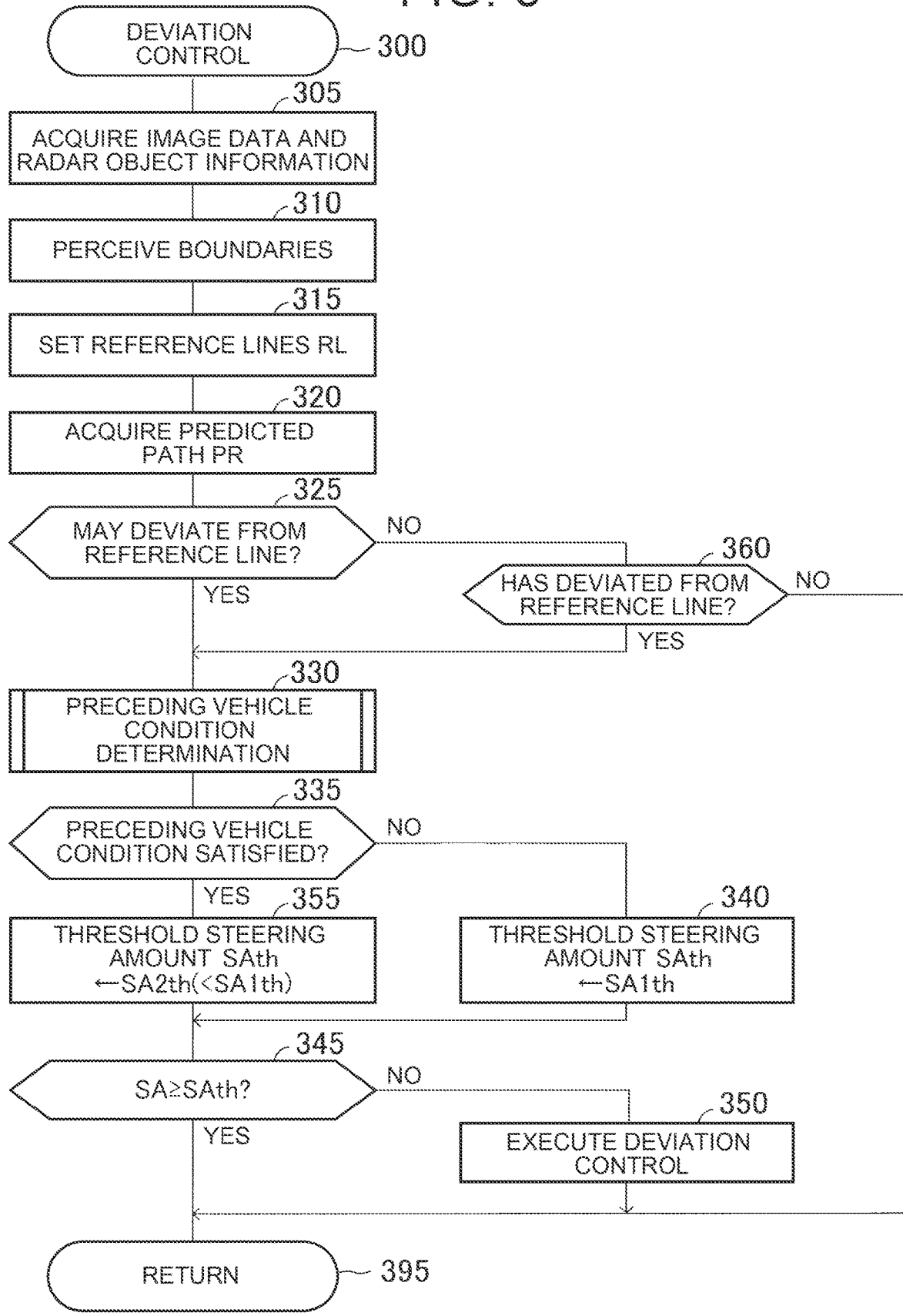
FIG. 3 is a flow chart of a deviation control routine executed by CPU of ECU shown in FIG. 1.

The CPU of the ECU 20 executes a routine shown by the flowchart in FIG. 3 at predetermined intervals.
When the appropriate time point comes, the CPU starts the process from step 300 of FIG. 3, and performs steps 305 to 325.

Step 305: The CPU acquires image data from the camera 22 and radar object information from the millimeter wave radar 24.
Step 310: The CPU perceives the left boundary LBL and right boundary RBL of the travel area TA based on the image data.
Step 315: The CPU sets the left reference line LRL and the right reference line RRL at positions away from the left boundary LBL and the right boundary RBL by the reference distance Dref, respectively.
Step 320: The CPU acquires the predicted path PR based on the host vehicle speed Vs and the yaw rate Yr.
Step 325: The CPU determines whether the predicted path PR intersects the reference line RL when the path distance Dpr is equal to or smaller than the threshold distance Dth.

When the path distance Dpr is equal to or smaller than the threshold distance Dth and the predicted path PR intersects the reference line RL, CPU predicts that the host vehicle SV deviates from the travel area TA. The CPU then determines "Yes" in step 325 and performs steps 330 and 335.

The step 330: CPU executes the preceding vehicle condition determination subroutine shown in FIG. 4 for determining whether or not the preceding vehicle condition is satisfied. The preceding vehicle condition determining subroutine will be described with reference to FIG. 4.
Step 335: The CPU determines whether the preceding vehicle condition is satisfied.

When the preceding vehicle condition is not satisfied, the CPU determines "No" in step 335 and executes step 340 and step 345.
Step 340: The CPU sets the threshold steering amount SAth to the first steering amount SA1*th*.

Step 345: The CPU determines whether the steering amount SA is equal to or greater than the threshold steering amount SAth.

When the steering amount SA is less than the threshold steering amount SAth, the CPU determines "No" in step 345 and proceeds to step 350. In step 350, the CPU performs the deviation control. After that, the CPU proceeds to step 395 and ends the routine once.

When the steering amount SA is equal to or greater than the threshold steering amount SAth, the CPU proceeds to step 395 and ends the routine once. Consequently, the CPU does not perform the deviation control.

When the preceding vehicle condition is satisfied when the CPU proceeds to step 335, the CPU determines "Yes" in step 335 and proceeds to step 355. In step 355, the CPU sets the threshold steering amount SAth to the "second steering amount SA2th smaller than the first steering amount SA1th". The CPU then proceeds to step 345.

When the CPU proceeds to step 325, when the path distance Dpr is equal to or less than the threshold distance Dth and the predicted path PR does not intersect the reference line RL, the CPU determines "No" in step 325 and proceeds to step 360. In step 360, the CPU determines whether the host vehicle SV deviates from either the left reference line LRL or the right reference line RRL.

When the host vehicle SV deviates from either the left reference line LRL or the right reference line RRL, the CPU determines "Yes" in step 360 and proceeds to step 330. On the other hand, when the host vehicle SV does not deviate from either the left reference line LRL or the right reference line RRL, the CPU determines "No" in step 360. After that, the CPU proceeds to step 395 and ends the routine once.
Preceding Vehicle Condition Determination Subroutine The CPU proceeds to step 330 in FIG. 3, and starts the process from step 400 in FIG. 4, and performs step 405 and step 410.

Step 405: The CPU acquires the left lateral distance DL and the right lateral distance DR of the preceding vehicle PV based on the image data and the radar object information.

Specifically, the CPU acquires the distance from the left boundary LBL to the point closest to the left boundary LBL of the preceding vehicle PV as the left lateral distance DL. The CPU sets the left lateral distance DL to "0" when the preceding vehicle PV deviates from the left boundary LBL. Similarly, the CPU acquires the distance from the right boundary RBL to the point closest to the right boundary RBL of the preceding vehicle PV as the right lateral distance DR, and sets the right lateral distance DR to "0" when the preceding vehicle PV deviates from the right boundary RBL.

Step 410: The CPU determines whether or not the left lateral distance DL is equal to or greater than the right lateral distance DR.

When the left lateral distance DL is equal to or greater than the right lateral distance DR, the CPU determines "Yes" in step 410 and performs steps 415 and 420.

Step 415: The CPU sets the lateral distance D to the left lateral distance DL. Step 420: The CPU determine whether the lateral distance D is equal to or greater than the first threshold distance D1th and equal to or less than the second threshold distance D2th.

When the lateral distance D is equal to or greater than the first threshold distance D1th and equal to or less than the second threshold distance D2th, the CPU determines "Yes" in step 420 and performs steps 425 and 430.

Step 425: The CPU acquires the preceding vehicle speed Vspv based on the relative speed Vr of the host vehicle speed Vs and the preceding vehicle PV.

Step 430: The CPU determines whether or not the preceding vehicle speed Vspv is equal to or less than the threshold vehicle speed Vsth.

When the preceding vehicle speed Vspv is equal to or less than the threshold vehicle speed Vsth, the CPU determines "Yes" in step 430 and proceeds to step 435. In step 435, it is determined based on the image data whether both the right and left turn signals of the preceding vehicle PV are activated.

When both the right and left turn signals of the preceding vehicle PV are activated, the CPU determines "Yes" in step 435 and proceeds to step 440. In step 440, the CPU determines that the preceding vehicle is satisfied. After that, the CPU proceeds to step 495 and ends the routine.

When the CPU proceeds to step 435, the CPU determines "No" in step 435 when neither the right turn signal nor the left turn signal of the preceding vehicle PV is activated, and proceeds to step 445.

In step 445, the CPU determines whether the left lateral distance DL is equal to or greater than the right lateral distance DR.

When the left lateral distance DL is equal to or greater than the right lateral distance DR, the CPU determines "Yes" in step 445 and proceeds to step 450. In step 450, the CPU determines whether the right turn signal of the preceding vehicle PV is activated.

When the right turn signal of the preceding vehicle PV is activated, the CPU determines "Yes" in step 450 and proceeds to step 440 to determine that the preceding vehicle is satisfied. On the other hand, when the right turn signal of the preceding vehicle PV is not activated, the CPU determines "No" in step 450 and proceeds to step 455. In step 455, the CPU determines that the preceding vehicle is not satisfied. After that, the CPU proceeds to step 495 and ends the routine.

When the CPU proceeds to step 410, if the left lateral distance DL is less than the right lateral distance DR (i.e., the right lateral distance DR is longer than the left lateral distance DL), the CPU determines "No" in step 410 and proceeds to step 460. In step 460, the CPU sets the lateral distance D to the right lateral distance DR. The CPU then proceeds to step 420.

When the CPU proceeds to step 445 and the left lateral distance DL is less than the right lateral distance DR, the CPU determines "No" in step 445 and proceeds to step 465. In step 465, the CPU determines whether the left turn signal of the preceding vehicle PV is activated.

When the left turn signal of the preceding vehicle PV is activated, the CPU determines "Yes" in step 465 and proceeds to step 440 to determine that the preceding vehicle is satisfied. On the other hand, when the left turn signal of the preceding vehicle PV is not activated, the CPU determines "No" in step 465, and proceeds to step 455 to determine that the preceding vehicle condition is not satisfied.

When the CPU proceeds to step 420 and the lateral distance D is less than the first threshold distance D1th or is longer than the second threshold distance D2th, the CPU determines "No" in step 420, and proceeds to step 455 to determine that the preceding vehicle condition is not satisfied.

When the CPU proceeds to step 430 and the preceding vehicle speed Vspv is equal to or less than the threshold vehicle speed Vsth, the CPU determines "No" in step 430, and proceeds to step 455 to determine that the preceding vehicle condition is not satisfied.

When there is no preceding vehicle, the CPU determines that the preceding vehicle condition is not satisfied.

First Modification

When the preceding vehicle condition is satisfied, the ECU 20 of the present modification reduces the deviation control by making the execution condition less easily satisfied than when the preceding vehicle condition is not satisfied. Accordingly, the deviation control is less likely to be executed while the driver is performing steering to pass the preceding vehicle. It is therefore possible to reduce the possibility that the driver may find the deviation control annoying.

The ECU 20 of the CPU of the present modification executes the deviation control routine shown in FIG. 5 instead of the deviation control routine shown in FIG. 3. In FIG. 5, the same steps as those in FIG. 3 are denoted by the same signs, and description thereof will be omitted.

When the appropriate time point has arrived, the CPU starts the process from step 500 in FIG. 5, and performs step 305 and step 310 shown in FIG. 5. Thereafter, in step 505, the CPU executes a preceding vehicle condition determination subroutine. This preceding vehicle condition determination subroutine is the same as the routine shown in FIG. 4, and therefore will not be described. Next, the CPU proceeds to step 510 to determine whether or not the preceding vehicle is satisfied.

When the preceding vehicle condition is not satisfied, the CPU determines "No" in step 510 and proceeds to step 515. In step 515, the CPU sets the first reference line RL1 as the reference line RL, and performs step 320 and step 325 shown in FIG. 5. Specifically, the CPU sets the first left reference line and the first right reference line as the left reference line LRL and the right reference line RRL at positions separated from the left boundary LBL and the right boundary RBL by the first reference distance Dref1, respectively.

When the predicted path PR intersects the reference line RL, CPU determines in step 325 shown in FIG. 5 that "Yes", and determines in step 345 shown in FIG. 5 whether the steering amount SA is equal to or less than the threshold steering amount SAth.

When the steering amount SA is less than the threshold steering amount SAth, CPU performs deviation control at step 350 shown in FIG. 5. After that, the CPU proceeds to step 595 and temporarily ends this routine. On the other hand, when the steering amount SA is equal to or greater than the threshold steering amount SAth, the CPU proceeds to step 595 and ends the routine once.

When the predicted path PR intersects the reference line RL, the CPU determines in step 325 shown in FIG. 5 as "No", and determines in step 360 shown in FIG. 5 as to whether the host vehicle SV has deviated from the reference line RL. If the host vehicle SV deviates from the reference line RL, the CPU proceeds to step 345 shown in FIG. 5, and if the host vehicle SV does not deviate from the reference line RL, the CPU proceeds to step 595 and ends the routine once.

If the preceding vehicle condition is satisfied when the CPU proceeds to step 510, CPU determines "Yes" in step 510, sets the second reference line RL2 as the reference line RL, and proceeds to step 320 shown in FIG. 5. Specifically, the CPU sets the second left reference line and the second right reference line as the left reference line LRL and the right reference line RRL at positions separated from the left boundary LBL and the right boundary RBL by the second reference distance Dref2, respectively. The second reference distance Dref2 is set to such a value that the second reference line Lc2th is located outward of the first reference line L1th with respect to the host vehicle SV (that is, the condition E1 is less easily satisfied).

When the preceding vehicle condition is satisfied, the CPU may make the execution condition less easily satisfied by making the threshold distance Dth of the condition E1 smaller than when the preceding vehicle condition is satisfied.

Second Modification

In the present modification, when the preceding vehicle condition is satisfied, the deviation control is reduced by reducing the upper limit steering angle θlmt as compared with the case where the preceding vehicle condition is not satisfied. Accordingly, even if the deviation control is executed while the driver performs the steering for overtaking the preceding vehicle, the deviation control is less likely to cause troublesomeness to the driver.

Third Modification

The ECU 20 of the present variation performs deviation warning instead of or simultaneously with the deviation control. In the deviation warning, the ECU 20 causes the display device 44 to display a deviation warning screen for warning the driver of a deviation from the travel area TA of the host vehicle SV. In the deviation warning, the ECU 20 may cause the speaker 46 to generate a deviation warning sound for warning the driver of deviation of the host vehicle SV from the travel area TA. The ECU 20 may simultaneously display the deviation warning screen and generate the deviation warning sound.

The present modification can be applied to the first modification and the second modification. In the case where the present modification is applied to the second modification, the ECU 20 reduces the deviation warning by reducing the alert level of the deviation warning when the preceding vehicle condition is satisfied compared to when the preceding vehicle condition is not satisfied. For example, the ECU 20 displays the deviation warning screen in white when the preceding vehicle condition is satisfied, and displays the deviation warning screen in red when the preceding vehicle condition is not satisfied. The ECU 20 reduces the volume of the deviation warning sound when the preceding vehicle condition is satisfied than when the preceding vehicle condition is not satisfied.

Fourth Modification

In the ECU 20 of the above embodiment, when the steering amount SA in the deviation direction is equal to or larger than the threshold steering amount SAth, it is determined that the condition S1 of the intentional steering condition is satisfied, but ECU 20 of the present modification may determine that the condition S1 is satisfied when the steering torque Tr in the deviation direction is equal to or larger than the threshold torque Trth.

Fifth Modification

Figure 4:
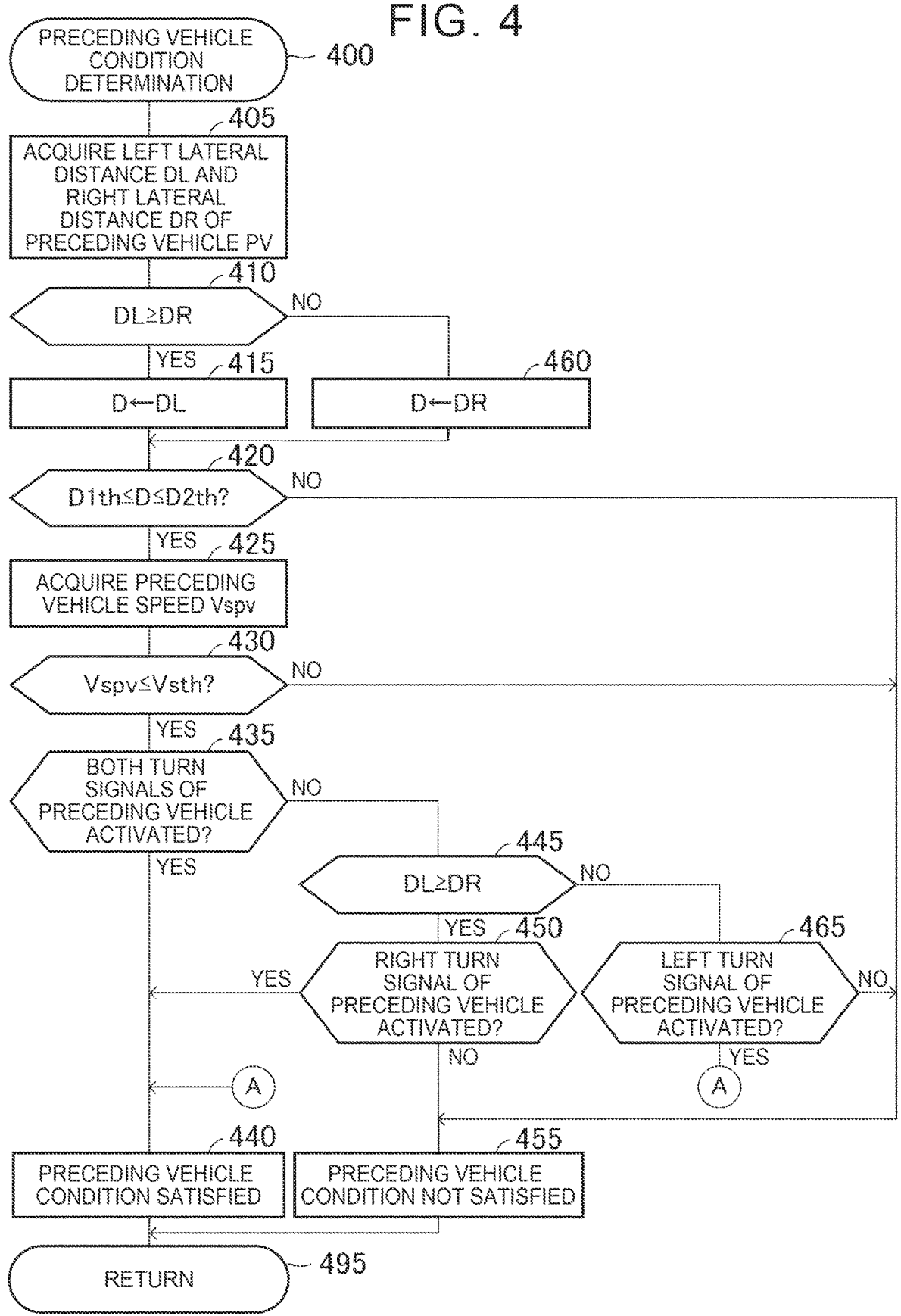
FIG. 4 is a flow chart of a preceding vehicle condition determination subroutine executed by CPU of ECU shown in FIG. 1.

In the ECU 20 of the above embodiment, in steps 410 to 420 and 460 shown in FIG. 4, it is determined whether or not the condition P1 of the preceding vehicle condition is satisfied by setting the longer one of the left lateral distance DL and the right lateral distance DR to the lateral distance D and determining whether or not the lateral distance D is equal to or greater than the first threshold distance D1th and equal to or less than the second threshold distance D2*th*. For example, ECU 20 may determine whether the left lateral distance DL or the right lateral distance DR is equal to or greater than the first threshold distance D1*th* and equal to or less than the second threshold distance D2*th*.

The device 10 is applicable to vehicles such as engine vehicles, hybrid electric vehicle, plug-in hybrid vehicles, fuel cell electric vehicle, and battery electric vehicle. Furthermore, the device 10 is applicable to an autonomous vehicle.

What is claimed is:

1. A vehicle control device, comprising:
a camera configured to capture an image of surroundings in front of a host vehicle and acquire image data; and
a control unit configured to execute, when an execution condition is satisfied, either or both of deviation warning related to deviation of the host vehicle from a travel area of the host vehicle and deviation control for reducing deviation of the host vehicle from the travel area, the travel area being an area identified based on the image data, and the execution condition being a condition that is satisfied when the host vehicle is predicted to deviate from the travel area or when the host vehicle has deviated from the travel area, wherein the control unit is configured to, when all of following three conditions are satisfied, reduce either or both of the deviation warning and the deviation control compared to when at least one of the three conditions is not satisfied: a first condition that another vehicle is detected in front of the host vehicle and a left lateral distance from a left boundary of the travel area to the other vehicle or a right lateral distance from a right boundary of the travel area to the other vehicle is equal to or greater than a first threshold distance, a second condition that a vehicle speed of the other vehicle is equal to or less than a threshold vehicle speed, and a third condition that both right and left turn signals of the other vehicle are activated, only the right turn signal of the other vehicle is activated when the left lateral distance is equal to or greater than the first threshold distance, or only the left turn signal of the other vehicle is activated when the right lateral distance is equal to or greater than the first threshold distance.

2. The vehicle control device according to claim 1, wherein the control unit is further configured to
when the left lateral distance is equal to or greater than the first threshold distance, determine that the first condition is satisfied when the left lateral distance is equal to or less than a second threshold distance set to a value greater than the first threshold distance, and
when the right lateral distance is equal to or greater than the first threshold distance, determine that the first condition is satisfied when the right lateral distance is equal to or less than the second threshold distance set to a value greater than the first threshold distance.

3. The vehicle control device according to claim 1, wherein the control unit is further configured to
even when the execution condition is satisfied, not perform the deviation control when an intentional steering condition is satisfied, the intentional steering condition being a condition for determining that a driver has intentionally steered the host vehicle to deviate from the travel area, and
when all of the first, second, and third conditions are satisfied, make the intentional steering condition more easily satisfied than when at least one of the first, second, and third conditions is not satisfied.

4. The vehicle control device according to claim 1, wherein the control unit is further configured to, when all of the first, second, and third conditions are satisfied, make the execution condition less easily satisfied than when at least one of the first, second, and third conditions is not satisfied.

5. The vehicle control device according to claim 1, wherein the control unit is further configured to, when all of the first, second, and third conditions are satisfied, reduce an alert level of the deviation warning when the control unit executes the deviation warning, and reduce a controlled variable of the deviation control when the control unit executes the deviation control, compared to when at least one of the first, second, and third conditions is not satisfied.

* * * * *